United States Patent
Krylova et al.

(10) Patent No.: US 6,313,062 B1
(45) Date of Patent: Nov. 6, 2001

(54) PROCESS FOR THE PREPARATION OF HIGH ACTIVITY CARBON MONOXIDE HYDROGENATION CATALYSTS; THE CATALYST COMPOSITION, USE OF THE CATALYSTS FOR CONDUCTING SUCH REACTIONS, AND THE PRODUCTS OF SUCH REACTIONS

(75) Inventors: Alla Jurievna Krylova, Graivorovskaja Ulitsa; Albert L'Vovich Lapidus, Krashirskoje; Maria Vadimovna Tsapkina, Moscow, all of (RU)

(73) Assignee: Exxon Reserach and Engineering Company, Annandale, NJ (US)

( * ) Notice: Subject to any disclaimer, the term of this patent is extended or adjusted under 35 U.S.C. 154(b) by 0 days.

(21) Appl. No.: 09/430,805

(22) Filed: Oct. 29, 1999

(51) Int. Cl.⁷ .............. B01J 23/40; B01J 23/00; B01J 23/42; C07C 27/00
(52) U.S. Cl. ............ 502/326; 502/325; 502/334; 518/715; 518/721
(58) Field of Search ............ 502/325, 326, 502/334; 518/715, 721

(56) References Cited

U.S. PATENT DOCUMENTS

| | | | |
|---|---|---|---|
| 4,078,743 | 3/1978 | Kogan et al. | 252/442 |
| 4,826,800 | * 5/1989 | McAteer | 502/303 |
| 5,939,350 | * 8/1999 | Singleton et al. | 502/230 |

FOREIGN PATENT DOCUMENTS 01228543    12/1989   (JP) .............. B01J/23/40

* cited by examiner

Primary Examiner—Johann Richter
Assistant Examiner—J. Parsa
(74) Attorney, Agent, or Firm—Norby L. Foss; Jay Simon

(57) ABSTRACT

A process for the preparation of a catalyst useful for conducting carbon monoxide hydrogenation reactions, particularly Fischer-Tropsch reactions; the catalyst compositions, use of the catalyst compositions for conducting such reactions, and the products of these reactions. The steps of the process for producing the catalyst comprise impregnating a powder, or particulate refractory inorganic oxide solids, preferably silica, with a) a soluble compound or salt of a catalytic metal of the Iron Group, preferably cobalt, and b) a soluble compound, or salt, of a Group VIII noble metal, preferably platinum, suitably by sequential contact of the solids with a solution of (a) and a solution of (b), by sequential contact of the solids with a solution of (b) and a solution of (a), or by contact with a solution which contains both (a) and (b). The metals impregnated solids, or particulate solids precursor material, after impregnation with the Group VIII noble metal, is washed with a hydrocarbyl ammonium hydroxide or ammonium hydroxide solution, the material shaped, dried and calcined, and the metals components thereof thereafter reduced to form the finished catalyst. The catalyst formed from the hydrocarbyl ammonium hydroxide or ammonium hydroxide-washed catalyst precursor, quite surprisingly, is more active and selective in conducting a carbon monoxide hydrogenation reaction to produce hydrocarbon waxes, with lower gas make, than a catalyst of corresponding composition similarly prepared except that the catalyst was prepared from a catalyst precursor which was not washed with a hydrocarbyl ammonium hydroxide or ammonium hydroxide solution.

18 Claims, No Drawings

PROCESS FOR THE PREPARATION OF HIGH ACTIVITY CARBON MONOXIDE HYDROGENATION CATALYSTS; THE CATALYST COMPOSITION, USE OF THE CATALYSTS FOR CONDUCTING SUCH REACTIONS, AND THE PRODUCTS OF SUCH REACTIONS

FIELD OF THE INVENTION

This invention relates to a process for the preparation of novel, highly active catalysts for conducting carbon monoxide hydrogenation reactions, especially Fischer-Tropsch reactions. It also relates to the catalyst, to the process utilizing the catalyst, and to the product of such process; particularly to the production of waxy paraffins of high quality from synthesis gas.

BACKGROUND

Reactions involving the hydrogenation of CO, e.g., Fischer-Tropsch (F-T) synthesis to produce hydrocarbons, are complex and produce many stages. As a consequence, this necessitates the use of multicomponent, polyfunctional catalysts; catalysts constituted of a supported catalytic metal, or metals, component, e.g., an Iron Group metal such as cobalt, which may be modified or promoted with an additional metal, or metals, e.g., rhenium. (Periodic Table of the Elements, Sargent-Welch Scientific Company; Skokie, Ill. Copyright 1979). Reaction occurs between the feed components, on contact with the catalytic metal, or metals, component and its oxide, reduction of the oxide (which may be reduced only with difficulty), and support component. Knowledge of these reactions is largely empirical, requiring the accumulation and correlation of large amounts of experimental data covering various parameters including not only the composition of the catalyst but also its method of preparation. Trial-and-error methods outstrip theory in the development of catalysts; and these methods are based on more than one hundred years of process developments utilizing catalysts.

Early F-T catalysts were formed by compositing Group VIII or Iron Group metals with kieselguhr, e.g., (100 wt. parts Co per 100 wt. parts kieselguhr), and additionally 20 wt. parts of an oxide of a Group VIIB metal, e.g., Mn, to improve the activity and yield of higher molecular weight hydrocarbons at higher reaction temperature. Further improvements in the development of F-T catalysts resulted in the use of $ThO_2$ (optimum 18 wt. parts per 100 parts Co) instead of $MnO_2$, and then to the replacement of part of the $ThO_2$ by a Group IIA metal oxide, MgO, while doubling the kieselguhr content to produce a commercial form of the catalyst (100:5:8:200).

Typically, in preparing catalysts for conducting F-T synthesis reactions, a Group VIII metal, preferably with an additional metal, e.g., a Group VIIB or VIII metal, or metals, to modify or promote the activity of the catalyst is composited with a particulate refractory inorganic oxide solids component by impregnation techniques. For example, cobalt may be first impregnated onto an alumina, silica, or titania support from a solution in which a soluble compound or salt of cobalt has been dissolved, and then a promoter metal, e.g., platinum, similarly added; or, cobalt and platinum can be coimpregnated onto a support from a single solution containing soluble compounds or salts of both cobalt and platinum. The metals impregnated support is then shaped, dried, calcined, and the metals component then reduced to activate and complete formation of the catalyst. These catalysts have considerably less activity than desired, and very low selectivity in producing hydrocarbon wax. Gas production is higher than is desirable. Consequently, there is need of a process for producing catalysts of these compositions but which have higher activity and improved selectivity.

THE INVENTION

This need and others is achieved in accordance with the present invention which embodies, in preparation of the catalyst, compositing with a refractory inorganic oxide solid, or solids, preferably silica, a catalytic metal of the Iron Group, preferably cobalt, and a Group VIII noble metal, preferably platinum. Preferably, the composite is formed by impregnation of the refractory inorganic oxide solid, or solids, with a solution of (a) a soluble compound, or salt, of the catalytic metal of the Iron Group, and a solution of (b) a soluble compound, or salt, of the Group VIII noble metal; the solid, or solids, being contacted with the solutions separately or in admixture, in a single or in multiple steps, and in any combination or sequence; and drying, calcining and washing the impregnated solid with an organo- or hydrocarbyl ammonium hydroxide, or ammonium hydroxide solution after the impregnation of the Group VIII noble metal salt or compound. The finished catalyst is produced, preferably by shaping the precursor, and then reducing at least a portion of the metals in the precursor to the metallic state. A catalyst produced by this process, quite surprisingly, is more active and selective in conducting a carbon monoxide hydrogenation reaction to produce hydrocarbon waxes, with lower gas make, than a catalyst of corresponding composition similarly prepared except that the catalyst was prepared from a catalyst precursor which was not washed with an organo- or hydrocarbyl ammonium hydroxide, or an ammonium hydroxide solution.

In preparation of the catalyst of this invention, the particulate solids support is contacted with a solution, or solutions, containing the solubilized metals in the desired stoichiometric amounts. For example, as is conventional, cobalt and platinum can be impregnated onto a particulate silica support by serial contact of the support, with, initially, a solution of a cobalt salt, e.g., cobalt nitrate and, preferably after drying and calcining the cobalt-impregnated solids, by contact of the cobalt impregnated support with a solution of a platinum salt, or compound, e.g., chloroplatinic acid or platinum acetylacetonate. Conversely, the order of the metals impregnation of the solids may be reversed, i.e., impregnation of the solids with the platinum may be conducted first; this being followed, after drying and calcination, by impregnation of the solids with cobalt. Alternatively, cobalt and platinum can be simultaneously impregnated onto the support by contact of the solids with a single solution containing both metals, and thereafter the catalyst may be dried, and calcined. In either event, after compositing the Group VIII noble metal, e.g., platinum, upon the support the noble metal, or platinum-impregnated solids is washed with a solution, or solutions, of the organoammonium, hydrocarbyl ammonium, or ammonium hydroxide. Preferably the wash step, or steps, is conducted immediately after impregnation of the noble metal onto the particulate support, after the noble metal-impregnated support has been first dried and calcined, whether or not the support was previously impregnated by the Iron Group metal. If increased concentrations of the catalytic metal, or metals, is desired, the cycle of impregnation steps can be repeated; or a partial cycle may be employed if it is desirable to increase the concentration of one metal on the support, without increasing the concentration of the other metal already impregnated onto the support. In either case, the catalyst precursor is washed with the organoammonium, hydrocarbyl ammonium, or ammonium hydroxide after application of the Group VIII noble metal.

The organoammonium, hydrocarbyl ammonium, or ammonium hydroxide compound used for washing the particulate Group VIII noble metal-containing solids is characterized generally by the formula

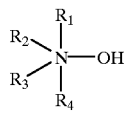

wherein $R_1$, $R_2$, $R_3$ and $R_4$ are the same or different, and identified as hydrogen, or an organo or hydrocarbyl substituent group, particularly an alkenyl, alkynyl or alkyl group, especially the latter. The chain length or an organo, or hydrocarbyl substituent can range from 1 to about 6, preferably 1 to about 3, sufficient that the organo, or hydrocarbyl ammonium compound is readily solubilized in the wash solution, preferably water. Exemplary of such hydrocarbyl groups are methyl, ethyl, vinyl, 1-propenyl, isobutyl, sec butyl, tert butyl, n-amyl, n-hexyl and the like. The preferred compound is one wherein at least 2, and preferably all of $R_1$, $R_2$, $R_3$ and $R_4$ are hydrogen, i.e., an organoammonium hydroxide, or ammonium hydroxide, directly or indirectly added to the solvent; e.g., by the addition of ammonia to water or other aqueous solvent; or as formed in situ, as from a triethyl amino or other nitrogen-containing compound by chemical reaction.

In forming the catalyst, the iron Group metal, preferably cobalt, is deposited on a particulate support in concentration ranging from about 5 percent to about 70 percent, preferably from about 10 percent to about 30 percent, based on the weight of the catalyst (dry basis). The Group VIII noble metal, preferably platinum, is deposited on the support in concentration ranging from about 0.10 percent to about 5 percent, preferably from about 0.20 percent to about 1.0 percent, and more preferably from about 0.50 percent to about 0.70 percent, based on the weight of the catalyst (dry basis). An additional metal, or metals, component can also be added if desired, to modify or promote the performance of the catalyst. For example, a Group VIIB or additional Group VIII metal may be added as a promoter, e.g., rhenium, generally in concentration ranging from about 0.5 percent to about 5 percent, preferably from about 0.2 percent to about 1.0 percent, based on the weight of the catalyst (dry basis). The balance of the catalyst is constituted of a support, preferably silica. The support ranging in concentration from about 25 percent to about 90 percent, based on the weight of the catalyst (dry basis).

After impregnation of the particulate solids support with a soluble compound, or salt of a catalytic metal of the Iron Group, and soluble compound or salt of a Group VIII noble metal, the impregnated support is preferably dried, suitably at temperature ranging from about 80° C. toy about 120° C., and then calcined at temperature ranging from about 300° C. to about 600° C., preferably from about 300° C. to about 500° C., in a stream of flowing gas.

The calcined catalyst is reduced by contact with hydrogen, or a hydrogen-containing gas, at temperature ranging from about 250° C. to about 600° C., preferably from about 275° C. to about 475° C., for periods ranging from about 0.5 hour to 24 hours; generally from about 0.5 hour to about 2 hours being adequate.

This preparation technique produces a catalyst of increased activity, and selectivity in the production of high melting wax via F-T synthesis. Carbon monoxide conversion is increased, $C_5+$ product is increased, and gas make is lowered.

Hydrocarbon Synthesis

In conducting the preferred Fischer-Tropsch, or F-T synthesis reaction, a mixture of hydrogen and carbon monoxide is reacted over an Iron Group metal catalyst, e.g., a cobalt or ruthenium catalyst, to produce a waxy product which can be separated in various fractions, suitably a heavy or high boiling fraction and a lighter or low boiling fraction, nominally a 700° F.+ (372° C.+) reactor wax and a 700° F.− (372° C.−) fraction. The latter, or 700° F.− (372° C.−) fraction, can be separated into (1) a F-T Cold separator liquid, or liquid nominally boiling within a range of about $C_5$–500° F. (260° C.), and (2) a F-T hot separator liquid, or liquid nominally boiling within a range of about 500° F.–700° F. (260° C.–372° C.). (3) The 700° F.+ (272° C.+) stream, with the F-T cold and hot separator liquids, constitute raw materials useful for further processing.

The F-T synthesis process is carried out at temperatures of about 160° C. to about 325° C., preferably from about 190° C. to about 260° C., pressures of about 5 atm to about 100 atm, preferably about 10–40 atm and gas hourly space velocities of from about 300 V/Hr/V to about 20,000 V/Hr/V, preferably from about 500 V/Hr/V to about 15,000 V/Hr/V. The stoichiometric ratio of hydrogen to carbon monoxide in the synthesis gas is about 2.1:1 for the production of higher hydrocarbons. However, the $H/CO_2$ ratios of 1:1 to about 4:1, preferably about 1.5:1 to about 2.5:1, more preferably about 1.8:1 to about 2.2:1 can be employed. These reaction conditions are well known and a particular set of reaction conditions can be readily determined by those skilled in the art. The reaction may be carried out in virtually any type reactor, e.g., fixed bed, moving bed, fluidized bed, slurry, bubbling bed, etc. The waxy or paraffinic products from the F-T reactor are essentially non-sulfur, non-nitrogen, non-aromatics containing hydrocarbons. This is a liquid product which can be produced and shipped from a remote area to a refinery site for further chemically reacting and upgrading to a variety of products, or produced and upgraded to a variety of products at a refinery site. For example, the hot separator and cold separator liquids, respectively, $C_4$–$C_{15}$ hydrocarbons, constitute high quality paraffin solvents which, if desired can be hydrotreated to remove olefin impurities, or employed without hydrotreating to produce a wide variety of wax products. The reactor wax, or $C_{16}+$ liquid hydrocarbons from the F-T reactor, on the other hand, can be upgraded by various hydroconversion reactions, e.g., hydrocracking, hydroisomerization, catalytic dewaxing, isodewaxing, reforming, etc. or combinations thereof, to produce (i) fuels, i.e., such as stable, environmentally benign, non-toxic mid-distillates, diesel and jet fuels, e.g., low freeze point jet fuel, high cetane jet fuel, etc., (ii) lubes, or lubricants, e.g., lube oil blending components and lube oil base stocks suitable for transportation vehicles, (iii) chemicals and specialty materials, e.g., non-toxic drilling oils suitable for use in drilling muds, technical and medicinal grade white oils, chemical raw materials, monomers, polymers, emulsions, isoparaffinic solvents, and various specialty products.

(I) Maximum Distillate

Option A: The reactor wax, or 700° F.+ (372° C.+) boiling fraction from the F-T reactor, with hydrogen, is passed directly to a hydroisomerization reactor, HI, operated at the following typical and preferred HI reaction conditions, to wit:

| HI Reactor Conditions | Typical Range | Preferred Range |
|---|---|---|
| Temperature, ° F. (° C.) | 300–800 (148–427) | 550–750 (286–398) |
| Total Pressure, psig | 0–2500 | 300–1200 |
| Hydrogen Treat Rate, SCF/B | 500–5000 | 2000–4000 |

While virtually any catalyst useful in hydroisomerization or selective hydrocracking may be satisfactory for this operation, some catalysts perform better than others. For example, catalysts containing a supported Group VIII noble metal, e.g., platinum or palladium, are particularly useful as are catalysts containing one or more Group VIII base metals, e.g., nickel, cobalt, in amounts of about 0.5–20 wt %, which may or may not also include a Group VI metal, e.g., molybdenum, in amounts of about 1–20 wt %. The support for the metals can be any refractory oxide or zeolite or mixtures thereof. Preferred supports include silica, alumina, silica-alumina, silica-alumina phosphates, titania, zirconia, vanadia and other Group III, IV, VA or VI oxides, as well as Y sieves, such as ultrastable Y sieves. Preferred supports include alumina and silica-alumina where the silica concentration of the bulk support is less than about 50 wt %, preferably less than about 35 wt %.

A preferred catalyst has a surface area in the range of about 180–400 m$^2$/gm, preferably 230–350 m$^2$/gm, and a pore volume of 0.3 to 1.0 ml/gm, preferably 0.35 to 0.75 ml/gm, a bulk density of about 0.5–1.0 g/ml, and a side crushing strength of about 0.8 to 3.5 kg/mm.

The preferred catalysts comprise a non-noble Group VIII metal, e.g., iron, nickel, in conjunction with a Group IB metal, e.g., copper, supported on an acidic support. The support is preferably an amorphous silica-alumina where the alumina is present in amounts of less than about 30 wt %, preferably 5–30 wt %, more preferably 10–20 wt %. Also, the support may contain small amounts, e.g., 20–30 wt %, of a binder, e.g., alumina, silica, Group IVA metal oxides, and various types of clays, magnesia, etc., preferably alumina. The catalyst is prepared by coimpregnating the metals from solutions onto the support, drying at 100–150° C., and calcining in air at 200–550° C.

The preparation of amorphous silica-alumina microspheres for supports is described in Ryland, Lloyd B., Tamele, M. W., and Wilson, J. N., Cracking Catalysts, Catalysis: Volume VII, Ed. Paul H. Emmett, Reinhold Publishing Corporation, New York, 1960, pp. 5–9.

The Group VIII metal is present in amounts of about 15 wt % or less, preferably 1–12 wt %, while the Group IB metal is usually present in lesser amounts, e.g., 1:2 to about 1:20 ratio respecting the Group VIII metal. A typical catalyst is shown below:

| Ni, wt % | 2.5–3.5 |
|---|---|
| Cu, wt % | 0.25–0.35 |
| Al$_2$O$_3$—SiO$_2$ | 65–75 |
| Al$_2$O$_3$(binder) | 25–30 |
| Surface Area | 290–355 m$^2$/gm |
| Pour Volume (Hg) | 0.35–0.45 ml/gm |
| Bulk Density | 0.58–0.68 g/ml |

The 700° F.+ (372° C.+) conversion to 700° F.− (372° C.−) in the hydro-isomerization unit ranges from about 20–80%, preferably 20–50%, more preferably about 30–50%. During hydroisomerization essentially all olefins and oxygen containing materials are hydrogenated.

In a preferred option, both the cold separator liquid, i.e., the C$_5$–500° (260° C.) boiling fraction, and the hot separator liquid, i.e., the 500° F.–700° F. (260° C.–372° C.) boiling fraction, are hydrotreated in a hydrotreated reactor, H/T, at hydrotreating conditions, the H/T product is combined with the HI product, and passed to a fractionator. The following describes the typical and preferred H/T reaction conditions, to wit:

| H/T Conditions | Typical Range | Preferred Range |
|---|---|---|
| Temperature, ° F. (° C.) | 200–750 (94–398) | 350–600 (175–315) |
| Total Pressure, psig | 100–1500 | 300–750 |
| Hydrogen Treat Rate, SCF/B | 100–5000 | 500–1500 |

Suitable hydrotreating catalysts include those which are comprised of at least one Group VIII metal, preferably Fe, Co and Ni, more preferably Co and/or Ni, and most preferably Ni; and at least one Group VI metal, preferably Mo and W, more preferably Mo, on a high surface area support material, preferably alumina. Other suitable hydrotreating catalysts include zeolitic catalysts, as well as noble metal catalysts where the noble metal is selected from Pd and Pt. One, or more than one type of hydrotreating catalyst may be used in the same bed. The Group VIII metal is typically present in an amount ranging from about 2 to 20%, preferably from about 4 to 12%, based on the total weight of the catalyst (wt. %, dry basis). The Group VI metal will typically be present in an amount ranging from about 5 to 50 wt. %, preferably from about 10 to 40 wt. %, and more preferably from about 20 to 30 wt. %.

Gas and C$_5$–250° F. (121° C.) condensate streams are recovered from the fractionator. After separation and removal of the C$_5$–250° F. (121° C.) material, a 250° F.–700° F.− (121° C.–372° C.−) diesel fuel or diesel fuel blending component is recovered from the fractionator. A 700° F.+ (372° C.+) product component that is recovered is suitable as a lube or lube oil blending component.

The diesel material recovered from the fractionator has the properties shown below:

paraffins at least 95 wt %, preferably at least 96 wt %, more preferably at least 97 wt %, still more preferably at least 98 wt %, and most preferably at least 99 wt %; iso/normal ratio about 0.3 to 3.0, preferably 0.7–2.0; sulfur 50 ppm (wt), preferably nil; nitrogen 50 ppm (wt), preferably 20 ppm, more preferably nil; unsaturates 2 wt %; (olefins and aromatics) oxygenates about 0.001 to less than 0.3 wt % oxygen water-free basis.

The isoparaffins which are present are largely mono methyl branched, and the product contains nil cyclic paraffins, e.g., no cyclohexane.

The 700° F.− (372° C.−) fraction is rich in oxygenates, and e.g., 95% of the oxygenates, are contained in this lighter fraction. Further, the olefin concentration of the lighter fraction is sufficiently low as to make olefin recovery unnecessary; and further treatment of the fraction for olefins is avoided.

These diesel fuels generally have the properties of high cetane number, usually 50 or higher, preferably at least about 60, more preferably at least about 65, lubricity, oxidative stability, and physical properties compatible with diesel pipeline specifications.

The product can be used as a diesel fuel per se or blended with other less desirable petroleum or hydrocarbon containing feeds of about the same boiling range. When used as a blend, the product can be used in relatively minor amounts, e.g., 10% or more for significantly improving the final blended diesel product.

Although, this material will improve almost any diesel product, it is especially useful in blending with refinery diesel streams of low quality. Typical streams are raw or hydrogenated catalytic or thermally cracked distillates and gas oils.

Option B: Optionally, the cold separator liquid and hot separator liquid is not subjected to any hydrotreating. In the absence of hydrotreating of the lighter fractions, the small amount of oxygenates, primarily linear alcohols, in this fraction can be preserved, though oxygenates in the heavier reactor wax fraction are eliminated during the hydroisomerization step. Hydroisomerization serves to increase the amount of isoparaffins in the distillate fuel and helps the fuel to meet pour point and cloud point specifications, although additives may be employed for these purposes.

The oxygen compounds that are believed to promote lubricity may be described as having a hydrogen bonding energy greater than the bonding energy of hydrocarbons (the energy measurements for various compounds are available in standard references); the greater the difference, the greater the lubricity effect. The oxygen compounds also have a lipophilic end and a hydrophilic end to allow wetting of the fuel.

Preferred oxygen compounds, primarily alcohols, have a relatively long chain, i.e., $C_{12}+$, more preferably $C_{12}$–$C_{24}$ primary linear alcohols.

The amount of oxygenates present is rather small, but only a small amount of oxygenates as oxygen on a water free basis is needed to achieve the desired lubricity, i.e., at least about 0.001 wt % oxygen (water free basis), preferably 0.001–0.3 wt % oxygen (water free basis), more preferably 0.0025–0.3 wt % oxygen (water free basis).

Option C: As a further option, all or preferably a portion of the cold separator liquid can be subjected to hydrotreating while the hot separator liquid and the reactor is hydroisomerized; the wider cut hydroisomerization eliminating the fractionator vessel. However, the freeze point of the jet fuel product is compromised to some extent. Preferably, the $C_5$–350° F. (175° C.) portion of the cold separator liquid is hydrotreated, while the 350° F.+ (175° C.+) material is blended wit h the hot separator liquid and the reactor wax and hydroisomer . The product of the HI reactor is the n blended with the hydrotreated $C_5$–350° F. (175° C.) product and recovered.

Option D: In a fourth option, a split-feed flow scheme is provided which can produce a jet fuel capable of meeting a jet A-1 freeze point specification. In this option, the hot separator liquid and the reactor wax is hydroisomerized and the product recovered. The cold separator liquid, and optionally any residual 500° F.– (260° C.–) components after subjecting the hot separator liquid and reactor wax to treatment in a wax fractionator prior to hydroisomerization, is subjected to hydrotreating. The hydrotreated product is separated into a (a) $C_5$–350° F. (175° C.) product which is recovered, and a 350° F.+ (175° C.) product which is hydroisomerized and the hydroisomerized product then also recovered. These products can be blended together to form a jet fuel meeting a jet A-1 freeze point specification.

(II) Production of Maximum Diesel

The three streams from the F-T reactor constituting the syncrude, viz. 1) the cold separator liquid ($C_5$–500° F.), 2) hot separator liquid (500° F.–700° F.), and 3) reactor wax (700° F.+) are each treated in accordance with certain options for producing the maximum amount of a diesel fuel as follows:

Option A: (Single Reaction Vessel; Wax Hydroisomerizer)

The reactor wax from the F-T reactor is passed, with hydrogen, to a wax hydroisomerizer. The other two streams from the F-T reactor, i.e., the cold separator liquid and the hot separator liquid, are combined with the product from the hydroisomerizer, and the total mixture is passed to a fractionation column where it is separated into light gases, naphtha, and a 700° F.– (372° C.–) distillate while a 700° F.+ (372° C.+) stream is recycled to extinction in the hydroisomerizer.

The catalysts used to conduct the wax hydroisomerization reaction are described in subsection (I) Maximum Distillate, Option A.

The conditions employed for conducting the wax hydroisomerization reaction are described in subsection (I) Maximum Distillate, Option A.

Option B: (Two Vessel System; Wax Hydroisomerizer and Hydrotreater)

In this Option B, the reactor wax treating scheme described for maximum diesel in accordance with option A is unchanged, but in this instance both the cold separator liquid and hot separator liquid are hydrotreated at hydrotreating conditions, the product therefrom is then mixed with the product of the wax hydroisomerizer, and the total mixture fractionated to recover light gases, naphtha and distillate.

The hydrotreating catalyst used in conducting the hydrogenation reaction is described in subsection (I) Maximum Distillate, Option A.

The conditions employed in conducting the hydrotreating reaction is described in subsection (I) Maximum Distillate, Option A.

Option C: (One Vessel; A Wax Hydroisomerizer)

In accordance with this option, both the cold separator liquid and the reactor wax are hydroisomerized, the hot separator liquid is mixed with the product from the hydroisomerizer, and the total mixture is passed to a fractionater where it is separated into light gases, naphtha and distillate. A 700° F.+ (372° C.+) fraction is recycled to extinction in the wax hydroisomerizer.

The catalyst used to conduct the wax hydroisomerization reaction is described in subsection (I) Maximum Distillate, Option A.

The conditions employed in conducting the hydroisomerization reaction is described in subsection (I) Maximum Distillate, Option A.

(III) Production of Maximum Lube

Two reaction vessels; a Hydroisomefizer and a Catalytic Dewaxing Unit)

The reactor wax, or 700° F.+ boiling fraction, and the hot separator liquid, or 500° F.–700° F. boiling fraction, from the F-T reactor are reacted in a hydroisomerizer and the product therefrom passed to a fractionator column wherein it is split into $C_1$–$C_4$ gases, naphtha, distillate and a 700° F.+ fraction.

The 700° F.+ fraction is dewaxed, preferably in a catalytic dewaxing unit, or is both catalytically dewaxed and the product then subjected to a low vacuum distillation, or fractionation, to produce a lubricant, or lubricants. The lubricant, or lubricants, is of high viscosity index and low pour point, and is recovered in high yield.

In conducting the hydroisomerization step, the feed, at least 50 percent, more preferably at least 70 percent, of which boils above 700° F., with hydrogen, is contacted and hydroisomerized over a hydroisomerization catalyst at hydroisomerization conditions sufficient to convert from about 20 percent to about 50 percent, preferably from about 30 to about 40 percent, of the 700° F.+ hydrocarbons of the feed to 700° F.− products, based on the weight of the total feed. At these conversion levels, major amounts of the n-paraffins are hydroisomerized, or converted to isoparaffins, with minimal hydrocracking to gas and fuel by-products.

The total feed to the hydroisomerization reactor, which constitutes from about 20 percent to about 90 percent, preferably from about 30 percent to about 70 percent, by weight of the total liquid output from the F-T reactor, is fed, with hydrogen, into the hydroisomerization reactor. The hydroisomerization reactor contains a bed of hydroisomerization catalyst with which the feed and hydrogen are contacted; the catalyst comprising a metal hydrogenation or dehydrogenation component composited with an acidic oxide carrier, or support. In the hydroisomerization reactor, the feed introduced thereto is thus converted to iso-paraffins and lower molecular weight species via hydroisomerization.

The hydrogenation or dehydrogenation metal component of the catalyst used in the hydroisomerization reactor may be any Group VIII metal of the Periodic Table of the Elements. Preferably the metal is a non-noble metal such as cobalt or nickel; with the preferred metal being cobalt. The catalytically active metal may be present in the catalyst together with one or more metal promoters or co-catalysts. The promoters may be present as metals or as metal oxides, depending upon the particular promoter. Suitable metal oxide promoters include oxides of metals from Group VI of the Periodic Table of the Elements. Preferably, the catalyst contains cobalt and molybdenum. The catalyst may also contain a hydrocracling suppressant since suppression of the cracking reaction is necessary. The hydrocracking suppressant may be either a Group IB metal or a source of sulfur, usually in the form of a sulfided catalytically active metal, or a Group IB metal and a source of sulfur.

The acidic oxide carrier component of the hydroisomerization catalyst can be furnished by a support with which the catalytic metal or metals can be composited by well known methods. The support can be any acidic oxide or mixture of oxides or zeolites or mixtures thereof. Preferred supports include silica, alumina, silica-alumina, silica-alumina-phosphates, titania, zirconia, vanadia and other Group III, IV, V or VI oxides, as well as Y sieves, such as ultra stable Y sieves. Preferred supports include alumina and silica-alumina, more preferably silica-alumina where the silica concentration of the bulk support is less than about 50 wt. %, preferably less than about 35 wt. %. Most preferably the concentration ranges from about 15 wt. % to about 30 wt. %. When alumina is used as the support, small amounts of chlorine or fluorine may be incorporated into the support to provide the acid functionality.

A preferred supported catalyst is one having surface areas in the range of about 180 to about 400 m²/gm, preferably about 230 to about 350 m²/gm, and a pore volume of about 0.3 to about 1.0 mL/gm, preferably about 0.35 to about 0.75 mL/gm, a bulk density of about 0.5 to about 1.0 g/mL, and a side crushing strength of about 0.8 to about 3.5 kg/mm.

The preparation of preferred amorphous silica-alumina microspheres for use as supports is described in Ryland, Lloyd B., Tamele, M. W., and Wilson, J. N., Cracking Catalysts, Catalysis; Volume VII, Ed. Paul H. Emmett, Reinhold Publishing Corporation, New York, 1960.

The hydroisomerization reactor is operated at conditions defined as follows:

| Major Operating Variables | Typical | Preferred |
| --- | --- | --- |
| Temperature, ° C. | 200–450 | 290–400 |
| Pressure, psig | 300–10,000 | 500–1500 |
| Hydrogen Treat Rate, SCF/B | 500–5000 | 1000–4000 |

During hydroisomerization, the amount of conversion of the 700° F.+ to 700° F.− is critical, and ranges from about 20 percent to about 50 percent, preferably from about 30 to about 40 percent; and at these conditions essentially all olefins and oxygenated products are hydrogenated.

The 700° F.+ fraction from the bottom of the fractionation column is passed to a catalytic dewaxing unit wherein the waxy lubricant molecules are subjected to a pour point reducing step to produce final or near-final lubricants; some of which may require further separation in a lube vacuum pipe still. Thus, a lubricant from the catalyst dewaxing unit can be passed to a low vacuum pipe still for further concentration of lube molecules into a final product.

The final pour point reducing step in the catalyst dewaxing unit is preferably carried out by contact with a unitized mixed powder pellet catalyst comprising a dehydrogenation component, a dewaxing component, and an isomerization component. The dehydrogenation component is a catalytically active metal, or metals, comprising a Group VIB, VIIB or Group VIII metal of the Periodic Table of the Elements. The dewaxing component is comprised of an intermediate or small pore crystalline zeolite, and the isomerization component is constituted of an amorphous acidic material. Such catalyst not only produces lubricants with high viscosity indexes and significantly reduced pour points but reduced yields of undesirable gas and naphtha.

Catalytic dewaxing is a process well documented in the literature; as are catalysts useful in such processes. However, the preferred catalysts employed in the catalytic dewaxing unit are unitized mixed powder pellet catalysts characterized as particulate solids particles made by mixing together a powdered molecular sieve dewaxing component and a powdered amorphous isomerization component, one or both components of which, preferably both, contains a dehydrogenation component, or components, (or to which is subsequently added a dehydrogenation component, or components), forming a homogeneous mass from the mixture, and pelletizing the mass to produce solids particles, or pellets, each of which contains the dewaxing component, the isomerization component, and the dehydrogenation component in intimate admixture; or contains the dewaxing component and the isomerization component to which is added the dehydroisomerization component, or components, to form particulate solids wherein the dewaxing component, the isomerizing component, and hydrogenation components are present in intimate mixture. The components of the catalyst work together, cooperatively and synergistically, to selectively crack and convert the n-paraffins, or waxy components of the feed, to produce reaction products which are removed from the process as gas, while allowing branched hydrocarbons to pass downstream for removal as useful lube oil blending components, and lube oil products. This catalyst permits the conversion of Fischer-Tropsch reaction products to upgraded products from which lubricants of high viscosity index and low pour point can be recovered. This objective, and others, is achieved while minimizing the production of the less desirable gas and naphtha.

In preparation of the unitized powder pellet catalyst, the catalytic metal, or metals, dehydrogenation component can be composited with the dewaxing component, or the catalyst metal, or metals, dehydrogenation component can be composited with the isomerization component, or the catalytic metal, or metals, dehydrogenation component can be composited with both the dewaxing and the isomerization components prior to formation of the unitized powder pellet catalyst. The unitized powder pellet catalyst can also be formed from a composite of the dewaxing and isomerization components and a catalytic metal, or metals, dehydrogenation component can then be deposited thereon. Suitably, the dehydrogenation component is a Group VIB, Group VIIB, or Group VIII metal, or metals, preferably a Group VIII noble metal, or metals, of the Periodic Table of the Elements (Sargent-Welch Scientific Company: Copyright 1968), suitably ruthenium, rhodium, palladium, osmium, iridium and platinum. Suitably, the catalytic metal, or metals, dehydrogenation component is present in concentration ranging from about 0.1 percent to about 5.0 percent, preferably from about 0.1 percent to about 3.0 percent, based on the weight of the total catalyst (dry basis). In general, the molecular sieve component is present in the catalyst in concentrations ranging from about 2 percent to about 80 percent, preferably from about 20 percent to about 60 percent, based on the weight of the catalyst (dry basis). The isomerization component is generally present in concentration ranging from about 20 percent to about 75 percent, preferably from about 30 percent to about 65 percent, based on the weight of the catalyst (dry basis).

The dewaxing component of the unitized powder pellet catalyst is preferably an intermediate pore, or a small pore size molecular sieve, or zeolite. A preferred molecular sieve dewaxing component is an intermediate pore size zeolite having a 10 membered ring unidirectional pore material which has oval 1-D pores having a minor axis between 4.2 Å and 4.8 Å and a major axis between 5.4 Å and 7.0 Å as determined by X-ray crystallography.

A yet more preferred dewaxing component used to form the unitized powder pellet catalyst is characterized as a small pore molecular sieve wherein the pore windows are formed by 8 oxide atoms that form the limiting edge of this pore window. The oxide atoms each constitute one of the four oxide atoms of a tetrahedrally coordinated cluster around a silicon or aluminum ion, called a framework ion or atom. Each oxide ion is coordinated to two framework ions in these structures. The structure is referred to as "8 ring" as a shorthand way of describing a more complex structure; a shorthand notation used extensively in describing molecular sieves of this type is the *Atlas Of Zeolite Structure Types*, Fourth Revised Edition 1996 in 8 Zeolites 17:1–230, 1996. Pores of this size are such as to substantially exclude molecules of larger size than normal hexane; or, conversely, to allow entry into the pores of molecules of smaller size than normal hexane. The small pore molecular sieve is of pore size ranging between about 6.3 Å and 2.3 Å, preferably about 5.1 Å to about 3.4 Å, and comprised of a crystalline tetrahedral framework oxide component. It is preferably selected from the group consisting of zeolites, tectosilicates, tetrahedral aluminophosphates and tetrahedral silicoaluminophosphates (SAPOs). Exemplary of the molecular sieve components of this type are SAPO-56, (AFX), ZK-5 (KFI), $AlPO_4$-25 (ATV), Chabazite (CHA), TMA-E (EAB), Erionite (ERI), and Linde Type A (LTA). The Linde Type A zeolite is a particularly preferred molecular sieve.

The catalysts, besides the dewaxing, isomerization, and dehydrogenated components, may optionally also contain binder materials. Exemplary of such binder materials are silica, alumina, silica-alumina, clays, magnesia, titania, zirconia or mixtures of these with each other or with other materials. Silica and alumina are preferred, with alumina being the most preferred binder. The binder, when present, is generally present in amount ranging from about 5 percent to about 50 percent, preferably from about 20 percent to about 30 percent, based on the weight of the total catalyst (dry basis; wt. %).

The unitized catalyst can be prepared by pulverizing and powdering and then mixing together a powdered finished molecular sieve catalyst and a powdered finished isomerization catalyst, as components, and then compressing the homogeneous mass to form particulate solid shapes, e.g., lumpy solid shapes, extrudates, beads, pellets, pills, tablets or the like; each solid shape of which contains the molecular sieve dewaxing component, the isomerization component and the dehydrogenation component. One or more catalysts of given type can be pulverized and powdered, and mixed to provide a necessary component, or components, of the unitized mixed pellet catalyst. For example, a molecular sieve catalyst can supply the dewaxing and dehydrogenating functions, to wit: a molecular sieve component composited with, preferably by impregnation, a Group VIII metal, or metals, of the Periodic Table, most preferably a Group VIII noble metal, or metals, e.g., platinum or palladium. Generally, the catalyst is impregnated with from about 0.1 percent to about 5.0 percent, preferably from about 0.1 percent to about 3.0 percent, based on the weight of the catalytic component (wt. %; dry basis).

The isomerization and dehydrogenation function, on the other hand, can be supplied by an isomerization catalyst. Thus, the isomerization component of the catalyst is comprised of an amorphous acidic material; an isomerization catalyst comprised of an acidic support composited with a catalytically active metal, preferably a Group VIII noble metal of the Periodic Table, suitably ruthenium, rhodium, palladium, osmium, iridium and platinum which can supply the isomerization and dehydrogenation functions. The isomerization catalyst component can thus be an isomerization catalyst such as those comprising a refractory metal oxide support base (e.g., alumina, silica-alumina, zirconia, titanium, etc.) on which is deposited a catalytically active metal selected from the group consisting of Group VIB, Group VIIB, Group VIII metals and mixtures thereof, preferably Group VIII metals, more preferably noble Group VIII metals, most preferably platinum or palladium and optionally including a promoter or dopant such as halogen, phosphorus, boron, yttria, magnesia, etc. preferably halogen, yttria or magnesia, most preferably fluorine. The catalytically active metals are present in the range of from about 0.1 to about 5.0 wt. %, preferably from about 0.1 to about 2.0 wt. %. The promoters and dopants are used to control the acidity of the isomerization catalyst. Thus, when the isomerization catalyst employs a base material such as alumina, acidity is imparted to the resultant catalyst by addition of a halogen, preferably fluorine. When a halogen is used, preferably fluorine, it is present in an amount in the range of about 0.1 to about 10 wt. %, preferably about 0.1 to about 3 wt. %, more preferably from about 0.1 to about 2 wt. % most preferably from about 0.5 to about 1.5 wt. %. Similarly, if silica-alumina is used as the base material, acidity can be controlled by adjusting the ratio of silica to alumina or by adding a dopant such as yttria or magnesia which reduces the acidity of the silica-alumina base material as taught in U.S.

Pat. No. 5,254,518 (Soled, McVicker, Gates, Miseo). One or more isomerization catalysts can be pulverized and powdered, and mixed to provide two of the necessary components of the unitized mixed pellet catalyst.

Dewaxing is preferably carried out in the catalyst dewaxing unit in a slurry phase, or phase wherein the catalyst is dispersed throughout and movable within a liquid paraffinic hydrocarbon oil. The 700° F.+ feed is passed, with hydrogen, into the catalyst dewaxing unit and reaction carried out at catalytic dewaxing conditions tabulated as follows:

| Major Operating Variable | Typical | Preferred |
| --- | --- | --- |
| Temperature, ° F. (° C.) | 300–840 (148–448) | 500–752 (260–400) |
| Pressure, psig | 300–10,000 | 500–1500 |
| Hydrogen Treat Rate, SCF/B | 500–5000 | 1000–4000 |

The product of the catalyst dewaxing unit is generally a fully converted dewaxed lube oil blending component, or lube oil having viscosity indexes ranging above about 110, and lube pour point below about −15° C.

The invention, and its mode of operation will be better understood by reference to the following examples and comparative demonstrations which illustrate specified and preferred embodiments. All parts are in terms of weight except as otherwise specified.

EXAMPLES

Preparation of Co—Pt/SiO$_2$ Catalyst Precursors (1) Silica gel, (KCKG #4 manufactured by Salavant Petro Chemical Catalyst Factory of Salavant Russia), 2–4 mm average diameter, was ground and sieved to obtain a fraction constituted of particles of 0.106–0.250 mm average diameter. The fraction of sieved silica gel was calcined in flowing air at 450° C. for 5 hours, and then cooled.

(2) To form a cobalt-silica composite, a solution of 5.18 gms of Co(NO$_3$)$_2$*6H$_2$O in 15 ml distilled water was prepared, and 21 ml (8.38 gm) of the calcined silica support was added thereto while the solution was vigorously stirred. The cobalt impregnated support was then dried on a steam bath. The dried catalyst precursor was then placed in a quartz tube and calcined in flowing air at 450° C. for 1 hour. The impregnated cobalt catalyst precursor, on a dry basis, contained nominally 10 wt. % cobalt.

(3) Next, to form a cobalt-platinum/silica composite, a solution of 0.0866 gm of Pt (acetylacetonate) in 15 ml of benzene was prepared, and to this solution was added with stirring the cobalt catalyst precursor the preparation of which is described in Step (2). The catalyst precursor was dried on a steam bath, and then calcined in flowing air at 450° C. for 1 hour. The catalyst precursor at this stage contained nominally 10 wt. % cobalt and 0.5 wt. % Pt, dry basis.

(4) (a) A first portion of the cobalt-platinum catalyst precursor from Step (3) was washed with ammonium hydroxide. Thus, first the cobalt-platinum catalyst precursor, was placed in a vessel and 100 ml of a solution of 28 wt. % NH$_3$ in H$_2$O was added, the solution stirred for 10 minutes, and the solution decanted. A second fresh 100 ml portion of 28 wt. % NH$_3$ in H$_2$O was then added to the vessel, stirred for 10 minutes, and the solution decanted. Finally, 170 ml of fresh solution containing 28 wt. % NH$_3$ in H$_2$O was added to the vessel, stirred for 20 minutes, and the solution then decanted. The catalyst precursor was dried on a steam bath, and the dried precursor was then placed in a quartz tube and calcined in flowing air at 450° C. for 1 hour.

(b) A second portion of the cobalt-platinum catalyst precursor from Step (3) was set aside for comparative testing; this portion of the catalyst precursor not being washed with ammonium hydroxide solution.

(5) To further increase the cobalt concentration in each of the two portions of cobalt-platinum catalyst precursor obtained in Steps (4a) and (4b), respectively, two solutions containing 5.18 gms of Co(NO$_3$)$_2$* 6 H$_2$O in 15 ml of distilled water were prepared and each added to a catalyst precursor (4a) and (4b), respectively, with stirring. Each catalyst precursor, the ammonium hydroxide-washed specimen and the unwashed specimen, was dried on a steam bath. Neither was calcined. At this stage, each catalyst precursor nominally contained 20 wt. % cobalt and 0.5 wt. % platinum.

Reduction of the Co—Si/SiO$_2$Catalyst Precursors to form Catalysts (6) The two portions of catalyst precursor described in Step (5), the ammonium hydroxide-washed and the unwashed specimens, respectively, were each mixed with 60 ml of 1–3 mm quartz particles and placed into a 25 mm ID quartz reactor. The catalyst/quartz mixture was held in place with glass wool at the bottom of the reactor and a layer consisting of 10 ml of the 1–3 mm quartz particles on top of the catalyst/quartz mixture. Hydrogen, prior to entering the reactor, was passed through a column of KOH pellets (pellet diameter nominally 3–5 mm) for removal of impurities. The hydrogen was then passed through the reactor at room temperature and atmospheric pressure at a gas hourly space velocity (GHSV) of 2000 hr$^{-1}$ for 15 minutes. The reactor temperature was increased to 450° C. over 40–45 minutes. This condition was held for 1 hour. Then the reactor was allowed to cool to room temperature in flowing hydrogen. After the reactor had cooled, the hydrogen flow was replaced with a flow of 2:1 H$_2$:CO synthesis gas blend at 100 hr$^{-1}$ GHSV for 15 minutes at atmospheric pressure. (As with the hydrogen, the synthesis gas blend was first passed through a column of KOH pellets for removal of impurities.) Thereafter, the valves were closed at the inlet and outlet of the reactor, storing the catalyst under the synthesis gas blend.

Synthesis Reactions with the Co—Pt/SiO$_2$ Catalyts (7) Runs were made with each of the catalysts from the ammonium hydroxide-washed catalyst precursor and the unwashed catalyst precursor, respectively, as follows:

Synthesis gas blend flow was resumed to the reactor and catalyst described in Step (6) at 100 hr$^{-1}$ GHSV and 1 atm pressure. The synthesis gas composition was 2:1 H$_2$:CO by volume. The reactor temperature was increased from room temperature to 160° C. in about 40 minutes. This condition was held for 5 hours, after which the reactor was cooled to room temperature in flowing synthesis gas blend and the catalyst stored under the synthesis gas blend as described in Step (6). Testing was resumed the next day following the same procedure, except that the test temperature was 10° C. higher. This was repeated each day until the optimum operating temperature was found. The optimum operating temperature was defined as the temperature where the yield of C$_5$+ products is maximized, as measured by the gm C$_5$+ product per standard cubic meter of synthesis gas blend fed to the reactor. Finding the optimum operating temperature entailed increasing the reactor temperature in 10° C. steps until the $C_5+$ yield decreased from the previous test. The temperature from the previous test is the optimum temperature. Catalyst performance was determined by measuring the gas contraction, product gas composition by gas chromatography, and $C_5+$ liquid product yield. The $C_5+$ was recovered from the reactor effluent using two traps. The first trap was water cooled and the second was cooled with dry ice/acetone (−80° C.). The $C_5+$ product in the first trap was weighed directly. The liquid product in the second trap was first warmed to room temperature to vaporize $C_4-$ components prior to weighing. The combined weight of the hydrocarbon liquid product in both traps was used to determine the $C_5+$ product yield. The $C_5+$ product from the optimum temperature was further analyzed to determine hydrocarbon type and carbon chain length distribution. From time to time, the $C_5+$ products from the non-optimum temperature tests were combined and analyzed.

Table 1 compares the results obtained from the two Co—Pt/SiO$_2$ catalysts, that made from the unwashed precursor and that made from the NH$_4$OH-washed precursor, respectively.

It is quite apparent that the catalyst made from the NH$_4$OH-washed Co—Pt/SiO$_2$ precursor provides many advantages over Co-Pt/SiO$_2$ catalysts made from unwashed precursors, to wit: It achieves, inter alia, optimum product distribution at a 20° C. lower operating temperature, higher CO conversion, higher $C_5+$ product and $C_5+$ selectivity, and lower gas make. The $C_5+$ product also has a considerably higher olefin content.

In contrast Co/SiO$_2$ catalysts made from an NH$_4$OH-washed Co/SiO$_2$ precursor, i.e., one which contains no noble metal, is adversely affected by the NH$_4$OH wash. CO conversion is lowered, $C_5+$ product and $C_5+$ selectivity is lowered, and gas make is increased. The $C_5+$ product has increased olefin content.

The hydrocarbons produced by a hydrocarbon synthesis process according to the invention are typically upgraded to more valuable products, by subjecting all or a portion of the $C_5+$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic

TABLE 1

20 Wt. % Co/0.5 Wt. % Pt/SiO$_2$ Catalysts Made With and Without NH$_4$OH Wash Treatment

| | | | Yield, gm/cu m Synthesis Gas | | | | | $C_5+$ Composition, Wt. % | | |
|---|---|---|---|---|---|---|---|---|---|---|
| Wash Treatment | Optimum Temp, ° C. | CO Conversion, % | CH$_4$ | C$_2$—C$_4$ | CO$_2$ | $C_5+$ | $C_5+$ Selectivity, % | Olefins | Linear Paraffins | Branched Paraffins |
| None | 220 | 65 | 25 | 20 | 28 | 92 | 67 | 4 | 58 | 37 |
| NH$_4$OH | 200 | 83 | 16 | 19 | 26 | 139 | 80 | 11 | 61 | 28 |

Synthesis Reactions with Co/SiO$_2$ Catalysts (8) Catalysts otherwise similar except that they do not contain a noble metal component, i.e., cobalt-silica catalysts, are not benefited by an NH$_4$OH wash of the catalyst precursor during the catalyst preparation step. In fact, an NH$_4$OH wash step is detrimental. To demonstrate this a 20 wt. % Co/SiO$_2$ catalyst was prepared as described above except that the step of adding the Pt to the precursor was avoided. The Co/SiO$_2$ catalyst precursor was divided into two portions, one portion was washed with NH$_4$OH and the other was not. Co/SiO$_2$ catalysts were prepared from each of the two portions of catalyst precursor and hydrocarbon synthesis runs made with each as described in Step (7). The results are given in Table 2.

cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils.

TABLE 2

20 Wt. % Co/SiO$_2$ Catalysts Made With and Without NH$_4$OH Wash Treatment

| | | | Yield, gm/cu m Synthesis Gas | | | | | $C_5+$ Composition, Wt. % | | |
|---|---|---|---|---|---|---|---|---|---|---|
| Wash Treatment | Optimum Temp, ° C. | CO Conversion, % | CH$_4$ | C$_2$—C$_4$ | CO$_2$ | $C_5+$ | $C_5+$ Selectivity, % | Olefins | Linear Paraffins | Branched Paraffins |
| None | 200 | 73 | 17 | 17 | 26 | 118 | 66 | 7 | 58 | 35 |
| NH$_4$OH | 200 | 64 | 20 | 16 | 34 | 95 | 58 | 9 | 59 | 32 |

Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

Having described the invention, what is claimed is:

1. Process for preparing a supported catalyst comprising a Group VIII noble metal and an Iron Group metal comprising:

(a) compositing a Group VIII noble metal or its salt on to a support, (b) drying and calcining the composited support, (c) washing the composited support with at least one of (i) hydrocarbyl ammonium hydroxide, or (ii) ammonium hydroxide solution, (d) drying and calcining the composited and washed support to form a supported catalyst, and further comprising.

(e) after any of the proceeding steps (a)–(d), compositing an Iron Group metal or its salt onto the support.

(f) and wherein when comprising said Iron group metal or salt on to the support follows step (d) repeating the drying and calcining of the supported catalyst.

2. A process according to claim 1 further comprising the step of reducing the composited support with a hydrogen or hydrogen containing gas following step (f).

3. A process according to claim 1, wherein the support is a refractory inorganic oxide.

4. A process according to claim 3 wherein the compositing is conducted by combining the refractory inorganic oxide solid, or solids, with a solution of a compound or salt of the catalytic metal of the Iron Group and a solution of a compound or salt of the Group VIII noble metal.

5. The process according to claim 1 wherein the Iron Group metal is cobalt, and the Group VIII noble metal is platinum.

6. The process of claim 1 wherein the support is further composited with at least one promoter metal.

7. The process of claim 6 wherein the promoter metal is rhenium.

8. The process of claim 1 wherein the Iron Group metal is composited upon the support in a concentration ranging from about 5 percent to about 70 percent, and the Group VIII noble metal is composited upon the support in a concentration ranging from about 0.10 percent to about 5 percent, based on the weight of the catalyst (dry basis).

9. The process of claim 8 where the concentration of the Iron Group metal ranges from about 10 percent to about 30 percent, and the concentration of the Group VIII noble metal ranges from about 0.2 percent to about 1.0 percent.

10. The process of claim 9 wherein the concentration of the Group VIII noble metal ranges from about 0.5 to about 0.7 percent.

11. The process of claim 3 wherein the refractory inorganic oxide support is silica.

12. The process of claim 11 wherein the silica is present in the finished catalyst composition in an amount sufficient to provide a concentration ranging from about 25 percent to about 90 percent, based on the weight of the catalyst (dry basis).

13. The process of claim 1 wherein the metals component of said catalyst is comprised of cobalt and platinum.

14. A process according to claim 2 further comprising repeating step (c) at least once.

15. The process of claim 3 wherein the refractory inorganic oxide support is silica, the Iron Group metal is cobalt, the Group VIII noble metal is platinum.

16. A carbon monoxide hydrogenation catalyst produced according to the process of claim 3.

17. The catalyst according to claim 16 wherein the Iron Group metal is cobalt.

18. The catalyst according to claim 16 wherein the Iron Group metal is cobalt, the Group VIII noble metal is platinum, and the refractory inorganic oxide support is silica.

* * * * *